Figure 1:
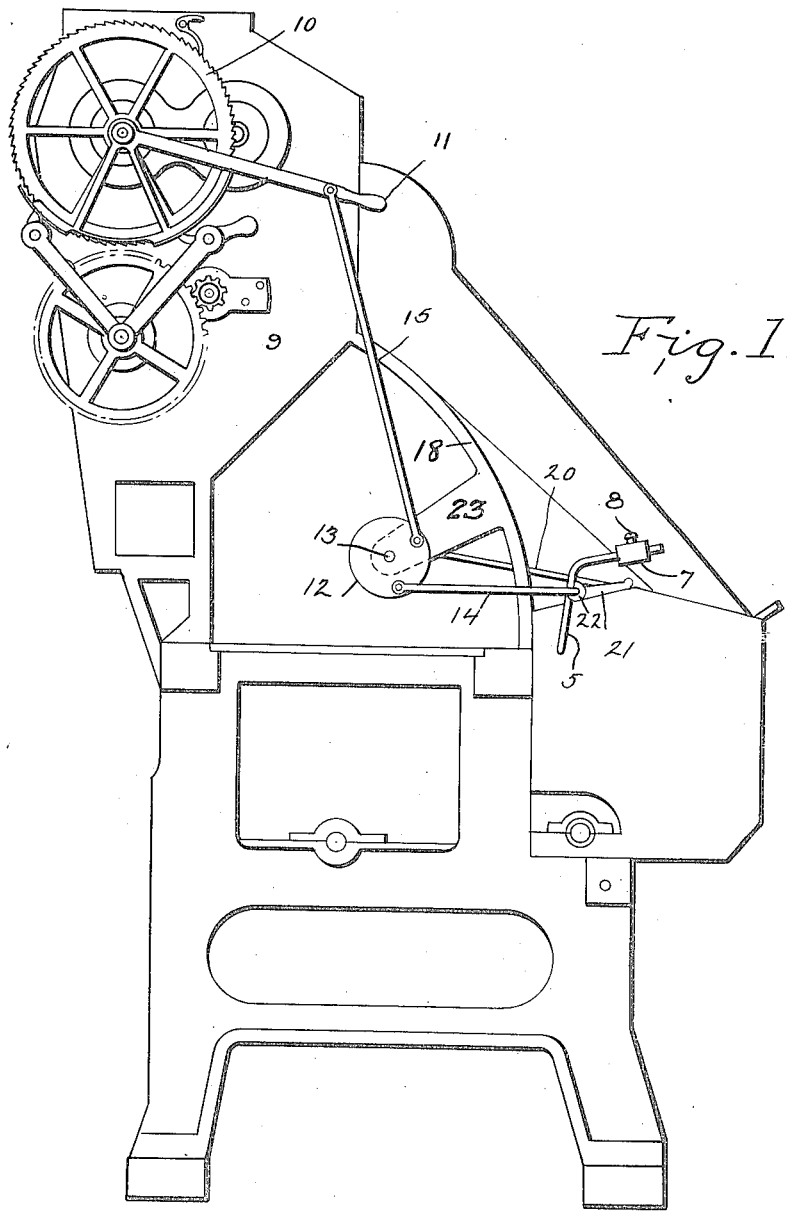

T. WEAR.
SELF ADJUSTING FEED ATTACHMENT FOR COTTON GINS.
APPLICATION FILED JULY 7, 1916.

1,208,423.

Patented Dec. 12, 1916.
2 SHEETS—SHEET 1.

Witness
Inventor
T. Wear

T. WEAR.
SELF ADJUSTING FEED ATTACHMENT FOR COTTON GINS.
APPLICATION FILED JULY 7, 1916.
1,208,423.
Patented Dec. 12, 1916.
2 SHEETS—SHEET 2.
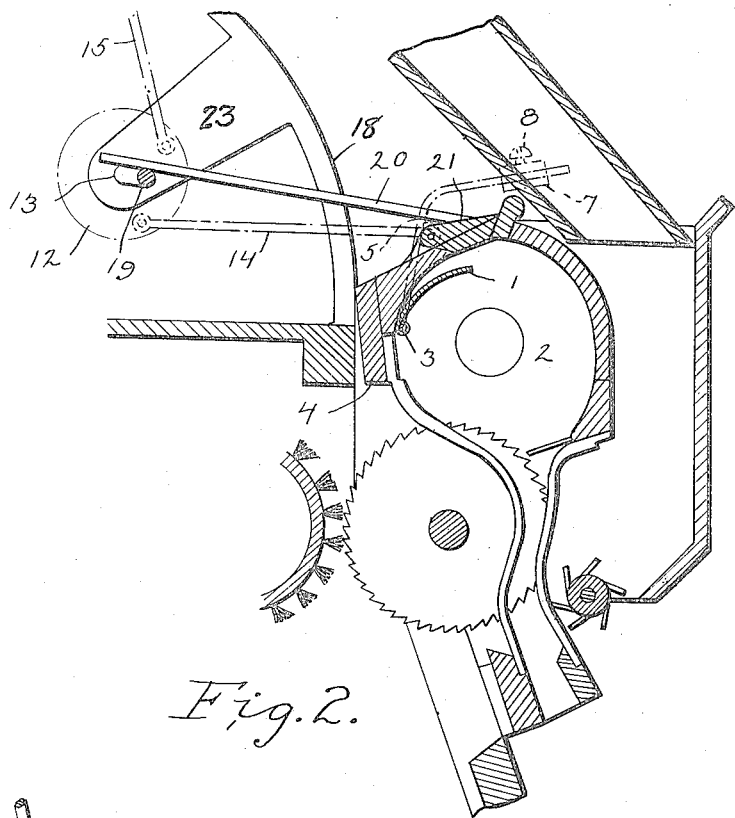
Fig. 2.
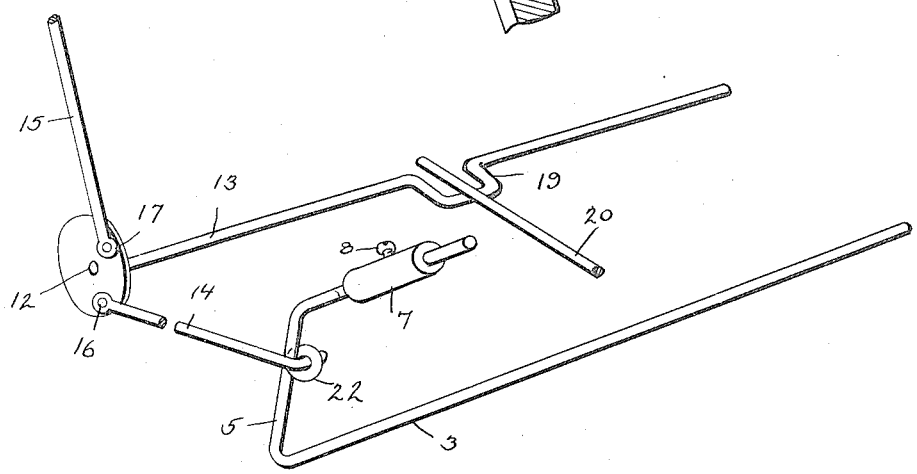
Fig. 3.
Inventor
T. Wear
Witness
By
Attorney

UNITED STATES PATENT OFFICE.

TANDY WEAR, OF PARIS, ARKANSAS, ASSIGNOR OF ONE-HALF TO HARRY E. ARNOLD, OF PARIS, ARKANSAS.

SELF-ADJUSTING FEED ATTACHMENT FOR COTTON-GINS.

1,208,423.     Specification of Letters Patent.     Patented Dec. 12, 1916.

Application filed July 7, 1916. Serial No. 107,996.

*To all whom it may concern:*

Be it known that I, TANDY WEAR, a citizen of the United States, residing at Paris, in the county of Logan and State of Arkansas, have invented certain new and useful Improvements in Self-Adjusting Feed Attachments for Cotton-Gins; and I do hereby declare the following to be a full, clear, and exact description of the invention, such as will enable others skilled in the art to which it appertains to make and use the same.

The invention relates to a self-adjusting feed attachment for cotton gins.

The object of the present invention is to provide a simple, practical and comparatively inexpensive feed attachment adapted to be readily applied to cotton gins and feeders of different types without necessitating any alteration in the construction thereof and capable of operation by the roll of cotton within the roll box to check or cut off the feed when the roll becomes too tight and to permit a heavier feed when the roll is loose.

It is also an object of the invention to provide an attachment of this character adapted to cut off the feed when the breast of the gin is raised for any purpose and capable of automatically starting the machine when the breast of the gin is closed.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawings Figure 1 is a side elevation of a cotton gin and feeder provided with an attachment constructed in accordance with this invention, Fig. 2 is a vertical sectional view of the same, Fig. 3 is a perspective view illustrating the arrangement of the shaft.

Like numerals of reference designate corresponding parts in the several figures of the drawings.

In the accompanying drawings in which is illustrated the preferred embodiment of the invention, the self-adjusting feed attachment is shown applied to a gin of the double rib huller type but it may of course be mounted on a single rib or any other form of gin as will be readily understood. The device comprises in its construction a curved pressure plate or board 1 located within the upper rear portion of the roll box 2 and extending entirely across the same and curved from its rear to its front edge to conform generally to the configuration of the roll of cotton within the roll box and mounted on a transverse shaft or pintle. The shaft or pintle rod 3 which is journaled in suitable bearings adjacent to the rib carrying board 4 extends through the side of the cotton gin and is provided with an exteriorly arranged arm 5 of approximately L-shape extending upwardly and then forwardly as clearly illustrated in Fig. 3 of the drawings. The forwardly extending upper portion of the arm carries an adjustable weight 7 secured to the arm by a set screw 8 or other suitable means and adapted to be moved backwardly and forwardly to increase the force with which the pressure board or plate is held against upward or backward movement. By this construction the tightness of the roll may be adjusted and it will be necessary for the roll of cotton operating within the roll box to lift the weight 7 in order to force the pressure board or plate upwardly and rearwardly to cut off or check the feed. The pressure board or plate may be constructed of any suitable material and may be mounted within the roll box in any desired manner as will be apparent and the amount of movement will of course correspond with the degree of movement required by the feeding mechanism of a cotton gin feeder.

The cotton gin has mounted upon it a cotton gin feeder 9 of the ordinary construction equipped with feeding mechanism 10 having a forwardly extending ratchet or lever 11 which is adapted to be lowered to cut off the feed of the cotton to the cotton gin. As the particular construction of the feed controlling and regulating mechanism of the cotton gin feeder is of the usual well known kind and as various forms of such feeding mechanism may be employed a particular description of the operation of the same is deemed unnecessary. Motion is communicated from the pressure board or plate to the controlling or ratchet lever of the said feed regulating mechanism 10 by means of a crank disk or element 12 mounted on a rear transverse shaft 13 and eccentrically connected by rods 14 and 15 with the arm 5 and with the said controlling lever 11. The rod 14 is connected at its rear end to the crank disk by a wrist pin 16. The rod 15 is connected at its lower end to the crank disk by a wrist pin 17 located at the front portion of the crank disk when the parts are arranged as shown in Figs. 1 and 2. The upward or rearward movement of the pressure board or member will move the lower portion of the crank disk rearwardly and this will draw the front wrist pin 17 downwardly and cut off the feed.

The transverse shaft 13 which is journaled in suitable bearings of the brackets or braces 18 is provided intermediate of its ends with a forwardly extending crank bend 19 located beneath a rearwardly extending arm 20 which is connected at its front portion with the breast 21 of the cotton gin whereby when the breast is raised the rearwardly extending arm will be swung downwardly and will carry with it the crank bend of the shaft 13 and thereby rotate the crank disk in the proper direction for cutting off the feed. When the breast is closed the arm 20 will be carried upwardly and the crank bend and the parts connected with the shaft 13 will be returned to their initial position by the weight 7 which will be lifted by the rearward movement of the rod 14 which is connected at its front end at 22 to the said arm 5. The braces 18 which are curved support the front portion of the feeder and are provided with rearwardly extending arms 23 in which the rear shaft 13 is journaled.

What is claimed is:—

1. The combination with a cotton gin having a hinged breast, and a cotton gin feeder provided with a controlling lever, a rotary element, means for connecting the rotary element with the controlling lever, mechanism for transmitting motion from the hinged breast to the rotary element, a pressure member mounted for movement within the roll box, and means for transmitting motion from the pressure member to the said rotary element.

2. The combination with a cotton gin having a hinged breast, and a cotton gin feeder provided with a controlling lever, a shaft provided with a crank lever, an arm carried by the gin breast and arranged to actuate the crank element for partially rotating the said shaft, means for transmitting motion from the shaft to the controlling lever, a pressure member mounted for movement within the roll box and means for transmitting motion from the pressure member to the said shaft.

3. The combination with a cotton gin having a movable breast, and a cotton gin feeder provided with a controlling lever, of a transverse shaft provided with a crank bend, a crank disk mounted on the transverse shaft, a pressure member hinged within the roll box, an exteriorly arranged weighted arm connected with the pressure member, rods connecting the crank disk with the said arm and the controlling lever and an arm carried by the breast of the gin and arranged to actuate the crank bend.

In testimony whereof I affix my signature in presence of two witnesses.

TANDY WEAR.

Witnesses:
   C. C. SADLER,
   H. E. ARNALD.